July 25, 1939. N. FREDIANI 2,167,353
CONFECTION
Filed Aug. 18, 1938
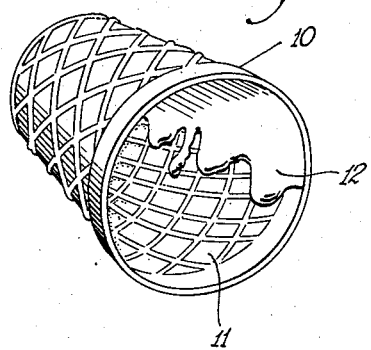
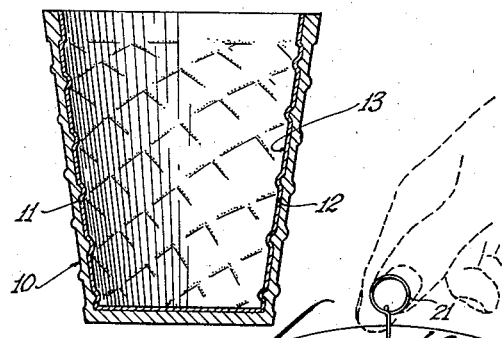
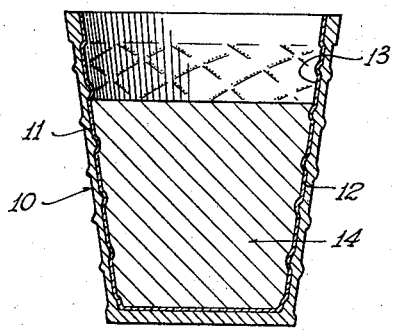
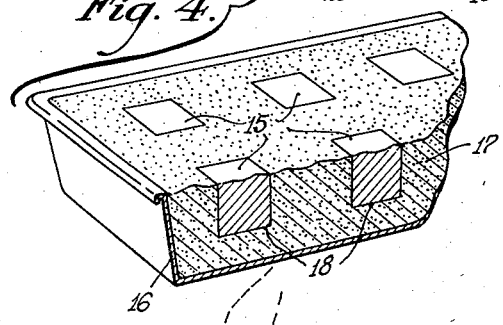
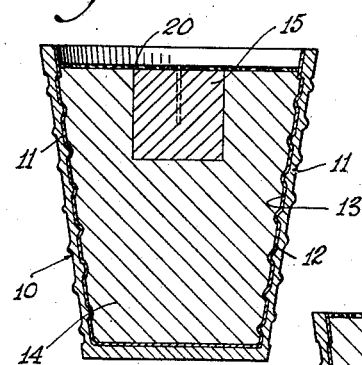
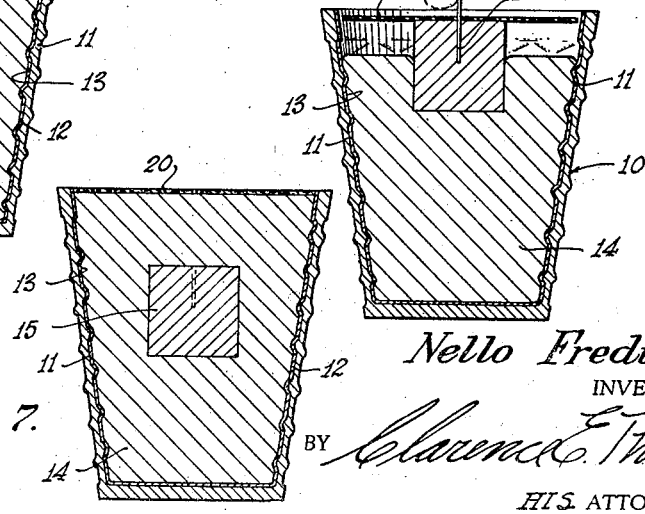
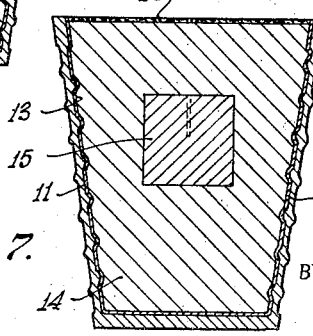
Nello Frediani
INVENTOR.
BY Clarence E. Threedy
HIS ATTORNEY.

Patented July 25, 1939

2,167,353

UNITED STATES PATENT OFFICE 2,167,353

CONFECTION

Nello Frediani, Lake Geneva, Wis.

Application August 18, 1938, Serial No. 225,554

3 Claims. (Cl. 99—137)

This invention relates to certain novel improvements in a confection and the method of making the same.

One of the several objects of the invention is the provision of a confection which will be readily acceptable by the purchasing public.

Another object of the invention is the employment of a method for producing a confection such as, for example, an ice cream confection in a cone or other container, whereby the manufacture of the confection will be economical and of such characteristics as will prevent the same from becoming soggy due to penetration of moisture through the walls of the container. In this connection, in the ordinary dispensing of ice cream in cones, unless the confection is consumed at once, the cone container becomes impregnated with moisture and the body thereof becomes soggy and distasteful to the consumer. The object of this invention is to prevent such a condition.

A still further object of the invention is to provide a method of confining a center or filler within the body of the ice cream confined in a cone or other container.

A still further object of the invention is to provide an economical pre-formed individual confection which can be manufactured and stored for a substantial period of time and which can be consumed in its entirety without aid of a spoon, saucer, or other utensil.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a perspective view of a cone container embodying my invention;

Fig. 2 is a vertical sectional detail view of the same;

Fig. 3 is a vertical sectional detail view of the same showing ice cream confined in the cone;

Fig. 4 is a fragmentary part sectional detail view of certain instrumentalities used in preparing the center or filling for the ice cream of the confection; and Figs. 5 to 7, inclusive, are cross-sectional detail views illustrating the filler or center confined, or partly confined within the ice cream contained in the cone container.

Referring more particularly to the drawing, in which the preferred form of my invention is illustrated, a container is indicated at 10. This container may be of any desired shape or design and formed of edible or non-edible material, as desired.

For the purpose of this description, the cone 10 is illustrated as cup-shaped, and it is desirable that the cone container be formed of edible material. The inner walls 11 of this cone are coated with a thin film of material, preferably, though not necessarily, formed of cocoa butter and powdered sugar, or cocoa butter or other fats and powdered sugar or powdered milk. This coating 12 is placed upon the wall 11 either by spraying or brushing the coating onto the wall 11 or by filling the cone container with the coating material and then pouring the same therefrom in a manner such that a thin film of coating remains upon the cone container, as indicated at 13 in Fig. 2. This coating, as heretofore indicated in the statement of objects, retards the penetration of moisture into the cone container and thus prevents over a great period of time the cone container from becoming soggy or otherwise distasteful in appearance.

In this cone container I confine a predetermined amount of ice cream, indicated at 14. While I have indicated that the cone container 13 has ice cream 14 contained therein, it is obvious that any other suitable edible material or substance may be substituted for the ice cream, but for the purpose of an understanding of this invention I prefer to refer to the contents of the cone container as ice cream.

This ice cream, for reasons which will appear hereinafter, is placed in the first instance in the cone container 10 in a semi-liquid condition. In this semi-liquid ice cream I confine a center or filler 15 which may be of any desired edible material, such as syrup, crushed pineapple, strawberry jelly, or the like, as is used in the well known ice cream sundaes or sodas.

This center or filler 15 is preferably produced in the following manner. I confine in a pan 16 or other suitable container a quantity of corn starch 17 or the like. In this corn starch body I form a plurality of molds 18. Into these molds 18 I pour the jelly which constitutes the filler or center 15. This pan or container 16 with the corn starch and fillers 15 is placed in a refrigerator so that the filler is permitted to become substantially hardened. After this has taken place, I remove each center or filler through the medium of a small pin or pick 19 pierced through a suitable cover disc 20 and having a finger loop 21 to facilitate handling of the filler or center after the same has been attached to the pick 19.

With the filler or center attached to the pick 19, the pick and cover are placed over the container cone in the manner shown in Fig. 5 and the filler forced into the semi-liquid ice cream or contents of the cone container.

This substantially submerges the filler or center in the ice cream in the manner shown in Fig. 6, after which, if desired, the pick may be removed, or if desired both the pick and the cover may be removed.

In Fig. 7 I have shown the center or filler completely submerged in the semi-liquid ice cream or contents of the cone container, and this is accomplished either by forcing the center or filler into the ice cream so that the same will flow in a position to completely submerge the filler or center in the ice cream, as shown. This feature of the invention is optional with the user or manufacturer.

In carrying out the provisions of my invention, I have produced a confection in the form of an ice cream cone which is delightful to the taste of the user, as well as serving to prevent the moisture from sapping through the cone container and thus rendering the container soggy or otherwise undesirable.

By the employment of my improved method, the confection may be completely manufactured prior to sale, placed in a suitable refrigerator, and subsequently sold as purchased. In other words, it is not necessary for the seller to make up each confection individually as and when called for by a purchaser.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A confection including a cup of edible panified material having its interior coated with an edible lining consisting of a vegetable fat and finely divided sugar, said cup being filled with ice cream.

2. A container made of an edible substance and having its inner surface coated with a composition consisting of cocoa butter and powdered sugar in proportions to form a paste of a consistency which will adhere to the surface portions of said container.

3. An ice cream container including a shell of ice cream cone dough, and a protective lining on the inner surface of said shell, said lining consisting of cocoa butter and powdered milk in proportions to provide a paste which will adhere to said surface.

NELLO FREDIANI.